Jan. 10, 1939.  G. F. ARCHER  2,143,755
WATER HEATING MEANS
Filed June 8, 1936  2 Sheets-Sheet 1
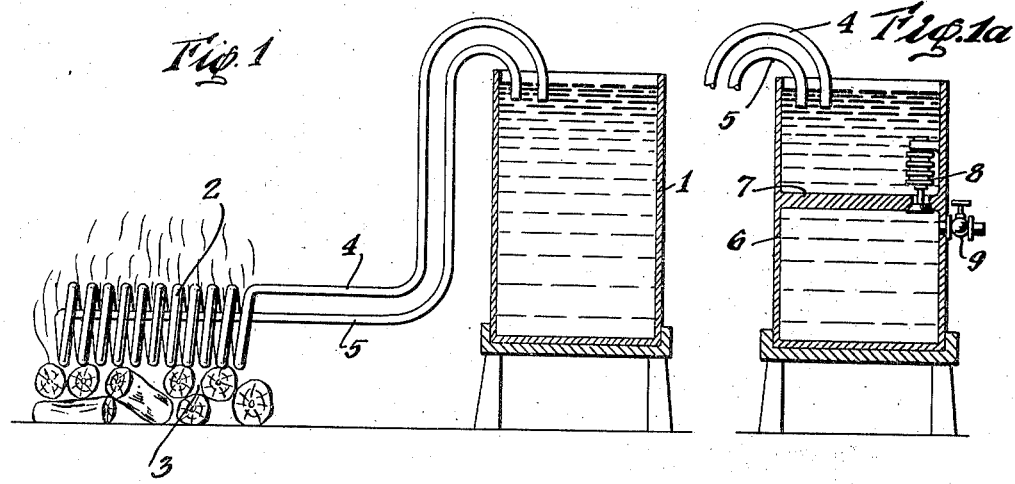
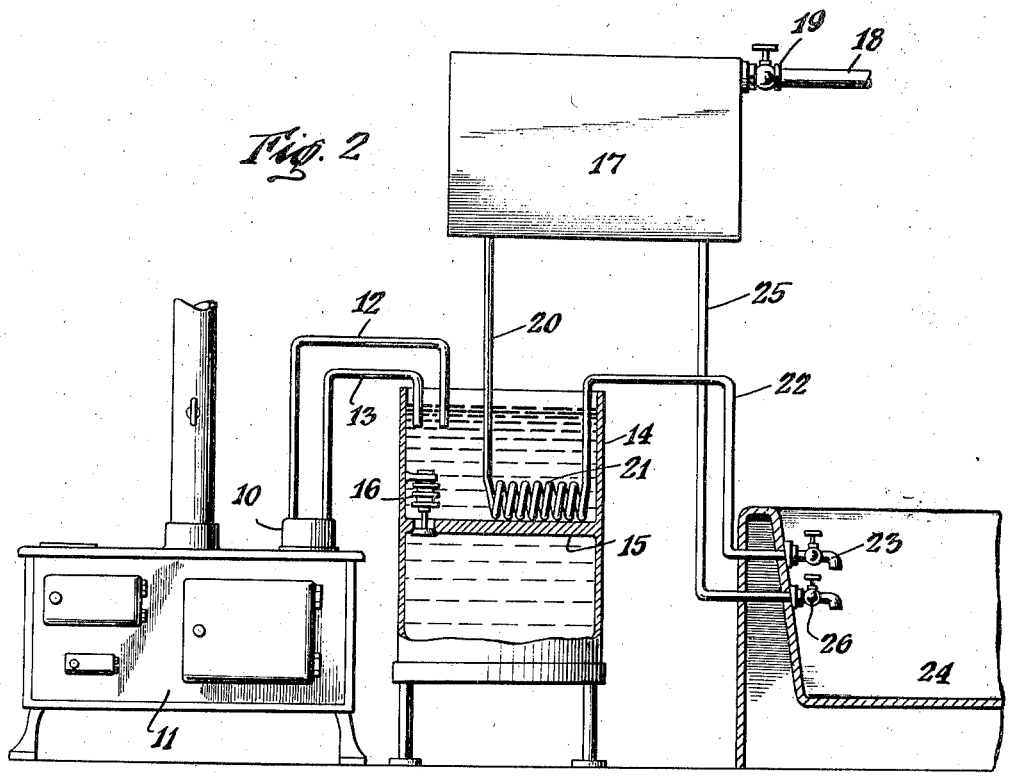
INVENTOR
George F. Archer
BY
Frederick W. Harker
ATTORNEY Jan. 10, 1939.    G. F. ARCHER    2,143,755
WATER HEATING MEANS
Filed June 8, 1936    2 Sheets-Sheet 2
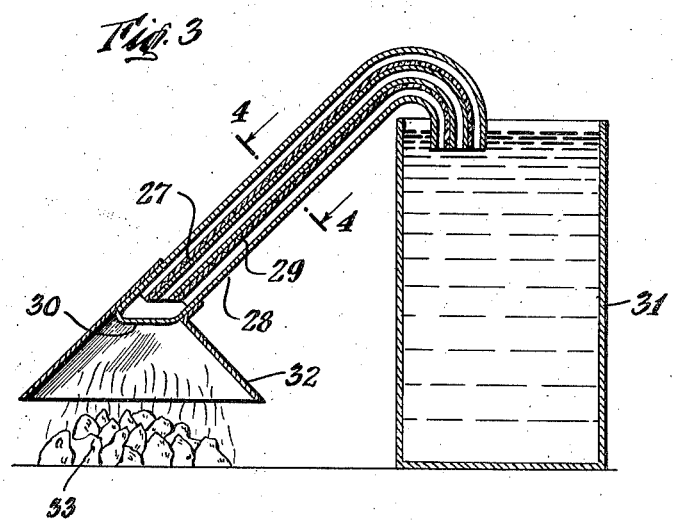
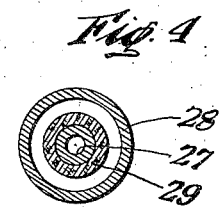
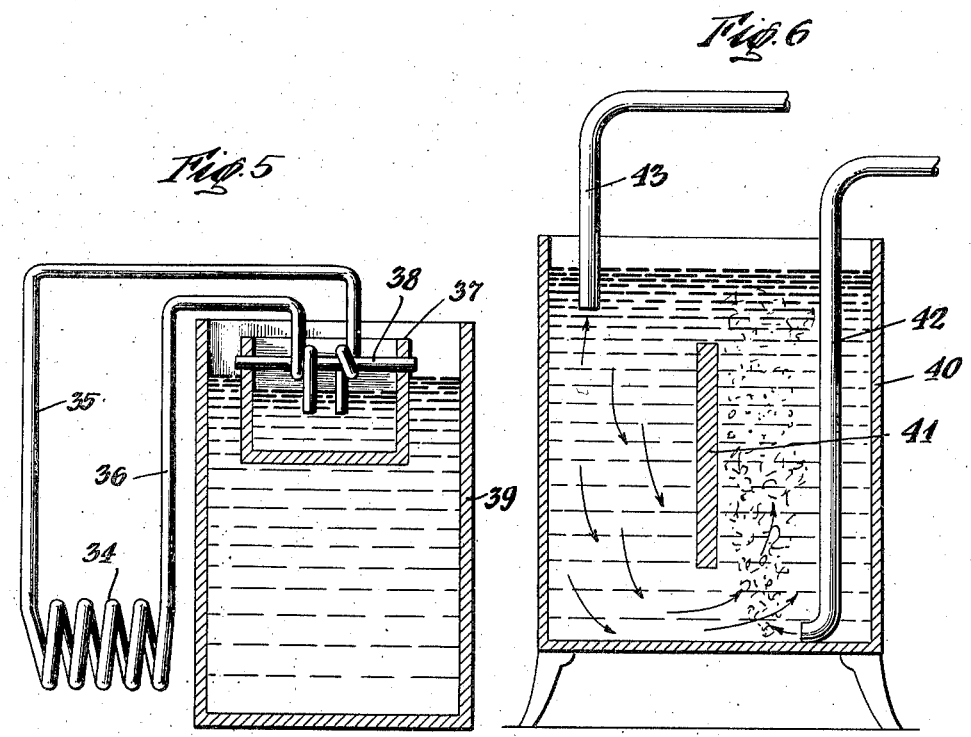
INVENTOR
George F. Archer
BY
Frederick W. Barker
ATTORNEY Patented Jan. 10, 1939

2,143,755

UNITED STATES PATENT OFFICE 2,143,755

WATER HEATING MEANS

George F. Archer, New York, N. Y.

Application June 8, 1936, Serial No. 84,125

3 Claims. (Cl. 126—344)

This invention relates to water heaters and my improvement is directed particularly to novel, simple and economical means whereby hot water may be obtained expeditiously, mainly for household purposes.

The device consists essentially of a coil or two-way line of piping whose opposite ends are lengthened or extended upwardly so that they may be bent downwardly and caused to be immersed from above, in water contained in a vessel of any desired character. The entire heater device is to be filled with water and the coil or lower portion thereof subjected to a source of heat, as by placing it in a fire. As the water in the coil heats up and expands it will flow from the piping into the vessel, and, under the principle of syphoning the displaced fluid in the coil will be constantly replaced from the vessel.

This simple and inexpensive expedient of a water filled coil or two-way line of piping with extended ends that are carried upwardly, over the edge of a vessel, and immersed in water therein, constitutes what I call a "Poor man's heater", the coil or equivalent portion of the device only being subjected to heat from any desired source.

As will appear in the following description this water heating principle is subject to a number of variations and uses.

In the drawings:—

Figure 1 is an elevation of my improved heater, in a simple form thereof, the water containing vessel appearing in section.

Fig. 1A is a fragmentary view similar to Fig. 1 but showing a modified form of same.

Fig. 2 is an elevation of a heater including a water supply reservoir, and showing a receptacle for heated water.

Fig. 3 is a view of a modified form of heater wherein insulated inner and outer pipes with a common genesis provide the outflow and return between a heat source and receiving vessel.

Fig. 4 is a section on the line 4—4 of Fig. 2.

Fig. 5 is a side elevation in section of a small water container carried by looped end portions of the coil piping and itself immersed in a larger or main water containing vessel, and Fig. 6 is a view of a clothes washing vessel with means for introducing hot water or steam in the vessel, and return means.

Considering first the basic idea involved in my invention we find in Fig. 1 a vessel 1 containing water to be heated, and a heating element in the form of a pipe coil 2 which is to be subjected to a source of heat, such for example as the fire 3. Said coil has the extended end portions 4, 5 which carry up and over the wall of vessel 1, the portion 4 being higher than portion 5, the mouths of said portions being entered in the vessel, below the water level therein. It is to be understood that the coil is filled with water so that as the temperature is raised therein the contained water will expand and flow through pipe 4 into the vessel, and from said vessel by syphoning will return to the coil through pipe portion 5, thus establishing a circulation and raising the temperature of the vessel contents.

Also in Fig. 1 there appears a vessel 6 having a horizontal partition 7 dividing it into upper and lower chambers. The water in the upper chamber is heated by the same coil, but a thermostatic valve 8 in the partition opens at a given temperature to allow mingling of the hot water in the upper chamber with the colder water in the lower chamber, and a faucet 9 permits heated water to be drawn off from said lower chamber. Obviously more than one thermostatic valve may be employed.

In Fig. 2 there is some elaboration of the heater principle and a pot 10 is used instead of the coil, the pot containing water which is adapted to fit one of the apertures in a cook stove 11. The upwardly extending, bent over pipes 12, 13 communicate between pot 10 and a vessel 14 that contains water, said vessel having a partition 15 with thermostatic valve 16 for the purpose previously described. But in this example a supply tank 17 is provided at a higher level, being fed by a main pipe 18 under the control of a valve 19; a pipe 20 passing to a coil 21 and leading by pipe 22, having a faucet 23, which enables hot water from said coil 21 to be communicated to a bath tub 24 or for other uses. Also a pipe 25 leading direct from the tank 17 and provided with a faucet 26 may supply cold water to the tub.

In the example of my invention illustrated in Figs. 3 and 4 I have shown a pipe 27 enclosed within a larger pipe 28, in spaced relation therewith, with a sheathing of insulating material 29 around said pipe 27. Said pipe terminates at one end in a common bowl or like heating element 30, and at their other ends are curved so that they may extend over the wall of the vessel 31 containing water, in which said ends are immersed. The pipes 27, 28 and bowl are to be filled with water and the bowl 30 may carry a hood 32 which is to be placed over a source of heat indicated at 33. The effect of this arrangement is that the water in the bowl and pipes will become heated and rise through pipe 28, entering the vessel and raising the temperature of the water therein. The return from the vessel will be through pipe 27, thus setting up a circulation in the manner previously described.

In Fig. 5 the coil 34 is to be subjected to heat and its extended end portions 35, 36 are shown bent over a small water container 37 in which is fixed a transverse bar 38, said end portions, 35, 36 being looped about said bar so that they may support container 37, in which the open ends of the pipes are immersed, to thus maintain a water filled condition for the coil and its extended portions. The purpose of this arrangement is that the small container may be removably placed within a larger, water filled vessel 39 when an increased volume of hot water is required for various uses.

The principle involved in my invention is also applicable to washing clothes and in Fig. 6 I have shown a wash boiler 40 in which is placed a transverse, vertical baffle 41. From one pipe portion 42 hot water or steam will issue near the bottom of the boiler to engage the clothes therein at one side of the baffle and the water from the boiler will return through the other pipe portion 43, whose open end is located just below the water level—it being understood that both pipe portions are included in the heating coil or other heating element (not shown in this view) to be subjected to a source of heat and to provide the circulation by expansion and syphoning which is a feature of my invention.

Variations within the spirit and scope of my invention are equally comprehended by the foregoing disclosure.

I claim:—

1. As a new article of manufacture a return conduit to contain water and having a portion adapted to be subjected to a source of heat, the ends of said return conduit being adjacent and bent downwardly for free entry below the surface of water in an open container therefor.

2. As a new article of manufacture a length of tubing to contain water and having an intermediate portion thereof formed into a coil for subjection to a source of heat, the tube portions which extend from the coil being inclined upwardly therefrom and bent over so that their ends may be entered below the surface of water in an open container therefor.

3. As a new article of manufacture a length of tubing to contain water and having one end closed for subjection to a source of heat, a smaller, open ended length of tubing concentrically positioned within said first named length of tubing, in spaced relation therewith, insulation surrounding said smaller length of tubing, the open ended portions of said tubes being bent over so that they may be entered below the surface of water in an open container therefor.

GEORGE F. ARCHER.